3,597,457
FLUOROALKYLAMIDOALKYLENE-SILOXANES
Thomas Alexander Robinson, Kilwinning, and James Jack, Troon, Scotland, assignors to Imperial Chemical Industries Limited, London, England
No Drawing. Filed Mar. 11, 1968, Ser. No. 711,882
Claims priority, application Great Britain, Mar. 15, 1967, 12,173/67
Int. Cl. C07f 7/10, 7/18
U.S. Cl. 260—404                17 Claims

ABSTRACT OF THE DISCLOSURE

Siloxanes useful as anti-foaming agents and for surface treatment of glass, textiles, etc., are provided which are the hydrolysis products of silanes of the formula

where Y is hydrogen, chlorine and fluorine, attached to the perfluoro-alkylene group $R_f$, R is hydrogen or alkyl, R' is a divalent hydrocarbyl group free from aliphatic unsaturation, R" is a hydrolyzable group, R''' is a hydrocarbyl or hydrolyzable group and R'$^v$ is hydrocarbyl.

---

This invention relates to new compounds and more particularly to organosilicon compounds containing fluorine.

A wide variety of organosilicon compounds are known and many of these are readily available. Among these compounds are some which contain one or more fluorine atoms, for example as constituents of fluorinated alkyl groups.

According to the present invention a new and useful class of fluorine-containing organosilicon compounds comprises silanes of the general formula

wherein Y is hydrogen, chlorine or fluorine and is attached to the terminal carbon atom of the group $R_f$, $R_f$ is a perfluoro-alkylene group, R is hydrogen or an alkyl group, R' is a divalent hydrocarbyl group free from aliphatic unsaturation, R" is a hydrolysable group, R''' is a hydrocarbyl group or a hydrolysable group and R'$^v$ is a hydrocarbyl group, and siloxanes capable of being obtained by hydrolysis of such a silane either alone or with at least other hydrolysable silane.

While Y may be hydrogen, chlorine or fluorine, it is for many purposes preferred that it be fluorine and for some purposes chlorine.

The group $R_f$ may be any perfluoro-alkylene group preferably having not more than 18 carbon atoms, and may or may not be straight chained. Straight chain groups are, however, normally preferred. Suitable groups include, for example, perfluoromethylene, perfluoropropylene, perfluorobutylene and perfluoro-octylene groups. It is generally further preferred that the perfluoroalkylene group should have from 4 to 12 carbon atoms and for many purposes perfluoro-octylene groups are particularly preferred.

The group R, which may be an alkyl group or hydrogen, preferably has not more than 2 carbon atoms when an alkyl group. It is also further preferred that it be hydrogen.

The group R' may be selected from a wide variety of divalent hydrocarbyl groups. Preferably, however, it contains from 2 to 11 carbon atoms. Suitable groups include, for example, ethylene, propylene and butylene groups. It is further preferred that it be an ethylene or a 1,3-propylene group and 1,3-propylene groups are especially preferred.

The silanes of our invention preferably have both R" and R''' hydrolysable and these may be a halogen such as chlorine, an acyloxy group, for example, an acetoxy group, or a hydrocarbyloxy group, for example, such as an alkoxy or substituted alkoxy group and preferably one containing not more than four carbon atoms. Suitable hydrocarbyloxy groups include, for example, methoxy, ethoxy, butoxy, β-methoxyethoxy and β-ethoxyethoxy groups.

The group R'$^v$ and the group R''' when not hydrolysable and which may be the same or different are preferably alkyl groups having not more than 4 carbon atoms, for example, such as methyl or ethyl groups. They may, however, be aryl groups such as phenyl groups. Methyl groups are, however, in general preferred.

The silanes of our invention include, for example, methyl-γ-(perfluoro-octano-amido)propyldichlorosilane, diethoxymethyl-γ-(perfluoro-octano-amido)propylsilane, methyl-γ-(perfluorobutyramido)propyldichlorosilane, dimethyl-γ-(perfluorobutyramido)propylchlorosilane, and ethoxydimethyl-γ-(perfluoro-octano-amido)propylsilane.

In one method of preparing our silanes, a silane containing a silicon-bonded hydrogen atom is reacted with an N-alkylene amide of a perfluoroalkyl carboxylic acid. This reaction may be carried out in presence of a catalyst of the kind known for use in the reaction between a compound containing a silicon-bonded hydrogen and an unsaturated compound, for example, metallic platinum supported on a substrate such as carbon or alumina, chloroplatinic acid, complexes of platinum halides with olefines, complexes formed by reacting chloroplatinic acid with alcohols, aldehydes or ethers, rhodium chloride-phosphine complexes and dicobalt octacarbonyl.

The reactants may be used in a wide range of proportions. It is, however, normally preferred to use a slight excess of the silane. This can very readily be removed from the reaction product by fractional distillation.

The reaction may be carried out either in presence or absence of a solvent. Suitable solvents include, for example, hydrocarbons such as hexane, toluene, benzene and xylene.

In another method of producing the compounds of our invention a lower alkyl ester of a perfluoro-alkyl carboxylic acid may be reacted with an amino-alkyl silicon compound which may be either a silane or a siloxane. The amino-alkyl group in such a silicon compound may be, for example, 3-aminopropyl, or 4-aminobutyl. Alternatively the alkyl ester may be replaced by a corresponding acid halide, for example, chloride.

The siloxanes of our invention may be prepared, for example, by hydrolysis of the silanes of our invention, either alone or admixed with one or more other hydrolysable silanes which may or may not be silanes of our invention. Suitable other silanes include, for example, methylchlorosilanes, phenylchlorosilanes, methylphenylchlorosilanes, methylvinylethoxysilanes and the like. The methods of hydrolysis used are those well known for hydrolysis of hydrolysable silanes. The siloxanes may also be obtained by hydrolysing one or more of our silanes and equilibrating the product with one or more other siloxanes not according to our invention.

In another method of preparing our siloxanes, a siloxane containing at least one silicon-bonded hydrogen atom is reacted with an unsaturated amide of a carboxylic acid of the kind described above. This reaction is also carried out in the presence of a catalyst of the type known for use in the reaction between a compound containing a silicon-bonded hydrogen and an unsaturated compound.

The catalysts suitable for use in the preparation of our silanes are also suitable for this process. The proportions of silicon-bonded hydrogen and reactants may, of course, be such that the product still contains a proportion of silicon-bonded hydrogen.

The siloxanes of our invention include those containing units of the general formulae

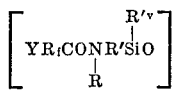

and

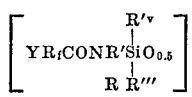

where Y, $R_f$, R, R', R''' and R'$^v$ are as previously defined except that R''' is not hydrolysable, with or without one or more other units of the general formulae

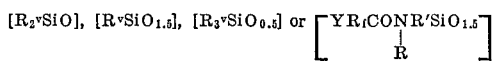

where R$^v$ is a hydrocarbyl group such as an alkyl, alkylene or aryl group such as, for example, methyl, ethyl, phenyl, vinyl or allyl groups, and Y, $R_f$, R and R' are as defined. Alkyl groups are preferred and methyl groups are particularly preferred.

The silanes and siloxanes of our invention have a wide variety of uses including, for example, use for surface treatment of materials such as glass, masonry, textiles and the like, and as anti-foam agents, for example, in organic solvent systems. The polysiloxanes containing the unit

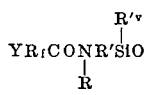

are especially useful for controlling foaming in solutions of conventional silicones such as the dimethylpolysiloxanes in aromatic and halogenated solvents.

Our invention is further illustrated by the following examples in which all parts and percentages are by weight.

EXAMPLE 1

A mixture of 11.3 parts of N-allylperfluoro-octanoamide, 10.4 parts of diethoxymethylsilane and 0.005 part of cyclohexene/platinous chloride complex as catalyst, was heated under reflux for 7 hours, after which it was fractionally distilled. There were thus obtained 12.4 parts of diethoxy - γ - (perfluoro-octano-amido)-propylmethylsilane, B.P. 103–110° C./0.2 mm. Hg.

EXAMPLE 2

A mixture of 12.65 parts of N-allylperfluorobutyramide, 13.40 parts of diethoxymethylsilane and 0.005 part of a cyclohexene/platinous chloride complex as catalyst, was heated under reflux for 3.5 hours, after which it was fractionally distilled. There were thus obtained 14 parts of diethoxy - γ - (perfluorobutylramido)propylmethylsilane, B.P. 169–171° C./42 mm. Hg. Calculated for $C_{12}F_7H_{20}O_3NSi$:

$OC_2H_5$, 23.3%. Found: $OCH_2H_5$, 23.5%.

EXAMPLE 3

A solution of 9.61 parts of N-allylperfluorobutyramide and 3.16 parts of a trimethylsilyl ended methylhydrogenpolysiloxane, having an average total of 52 silicon atoms and 50 hydrogen atoms attached to silicon atoms, in 20 parts of toluene containing 0.005 part of a cyclohexene/platinous chloride complex as catalyst, was heated under reflux for 1 hour. The mixture was thereafter allowed to separate. The heavy layer which settled out was of the average formula

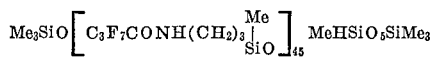

The critical surface tension of films of the so-prepared product on glass was determined by the method of Zisman (Contact angle, Wettability and Adhesion: A.C.S. Monograph No. 43, chapter 1). Films were obtained by spreading the product with a knife edge on glass slides after which drops of the homologous series of hydrocarbons, hexane, heptane, octane, decane and dodecane were placed on the films, and the contact angle measured by the method of Fort and Patterson (J. Colloid Sci., 1963, 18, 217). The critical surface tension for wetting the surface of the glass slides was 11.5 dynes/cm.

EXAMPLE 4

A mixture of 8.60 parts of N-allylperfluoro-octanoamide, 1.58 parts of the organopolysiloxane used in Example 3, and 0.050 part of platinum supported on alumina as catalyst, was heated in an oil bath maintained at about 170° C. for 30 minutes. A very viscous homogeneous fluid having the average general formula:

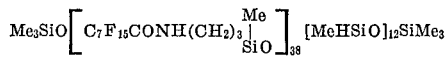

was obtained. This product was soluble in 1,1,2-trichloro-1,2,2-trifluoroethane on heating at reflux temperature.

EXAMPLE 5

2 parts of N/10 aqueous hydrochloric acid were added to 8.8 parts of diethoxy-γ-(perfluoro-octano-amido)propylmethylsilane dissolved in 30 parts of chloroform. The solution was heated under reflux for 2 hours after which the solvent was removed by evaporation and the water removed by azeotropic distillation with carbon tetrachloride. There were thus obtained 7.7 parts of a clear viscous polysiloxane containing no free alkoxy groups (confirmed by infra-red spectroscopy).

A solution of 0.05 part of a trimethylsilyl ended dimethylpolysiloxane liquid of viscosity 300 cs. at 25° C. in 8 parts of trichloroethylene was shaken vigorously causing foaming. 0.05 part of a solution of 0.10 part of the product so prepared dissolved in 16 parts of 1,1,2-trichloro-1,2,2-trifluoroethane, was added to the foamed solution whereupon rapid defoaming occurred.

EXAMPLE 6

1 part of N/10 aqueous hydrochloric acid was added to a solution of 1.35 parts of diethoxy-(perfluoro-octanoamido)propylmethylsilane and 1.23 parts of triethoxy-(perfluoro-octano-amido)propylsilane in 15 parts of chloroform. The solution was heated under reflux for 2 hours after which the solvent was evaporated off and the water removed by azeotropic distillation with carbon tetrachloride. There were thus obtained 2.5 parts of a semi-solid wax-like material which was soluble in 1,1,2-trichloro-1,2,2-trifluoroethane.

EXAMPLE 7

Portions of a "Terylene" polyester/cotton gaberdine fabric were treated with solutions of the fluorosiloxane products of Examples 3, 4, 5 and 6. Before treatment with the products of Examples 3 and 4 the textile fabric was immersed in a 2.5 percent solution in methanol of a catalyst (an amine-epoxy condensate prepared as described in Example 5 of British patent specification 933,729) and air dried. In each case the fabric was immersed in a 2 percent solution in 1,1,2-trichloro-1,2,2-trifluoroethane of the fluorosiloxane and air dried. The amount of catalyst and amount of siloxane applied to the fabric was determined by measuring the gain in weight. The treated fabrics were then heated in an air circulating oven at 150° C. for 3 minutes.

The water repellency of the treated fabrics was determined by the Bundesmann test procedure and the oil repellency by the method of the Minnesota Mining and Manufacturing Co. as described in British patent specification No. 961,064.

The washing procedure used was to wash in a 0.2 percent aqueous solution of Lux at 50° C. for 20 minutes, followed by 2 rinses in water. Each portion of treated fabric was given 5 wash treatments.

The amount of catalyst and siloxane expressed as a percentage of the weight of fabric and the oil repellency and Bundesmann test results are given in the table below.

neutralised with sodium bicarbonate powder and dried. The organic layer was filtered through "Celite" (registered trademark) and solvent and volatile materials removed. There were thus obtained 5.3 parts of a clear, pale yellow, viscous oil $n^{16}$ 1.3788. Found: F, 39.1%.

EXAMPLE 12

17.4 parts of octamethylcyclotetrasiloxane and 13.4 parts of 1,3-bis-3-(perfluoro-octanoylamino)-1,1,3,3-tetramethyldisiloxane were heated under reflux for 30 minutes with 0.2 part of fuller's earth moistened with concentrated sulphuric acid. The homogeneous mixture so ob-

| | | | | Bundesmann test | | | |
|---|---|---|---|---|---|---|---|
| | | Oil repellency | | Before washing | | After washing | |
| | Catalyst pick-up (percent) | Silicone pick-up (percent) | Before washing | After washing | Penetration (grams) | Absorption (percent) | Penetration (grams) | Absorption (percent) |
| Example: | | | | | | | | |
| 3 | 1.1 | 3.5 | 50 | | | | | |
| 4 | 0.5 | 3.6 | 90 | 80 | 0 | 26 | 0 | 28 |
| 5 | Nil | 2.3 | 100 | 50 | 1 | 26 | | |
| 6 | Nil | 2.2 | 95 | 50 | 0 | 25 | | |

EXAMPLE 8

A mixture of 5.92 parts of

0.95 part of the polysiloxane used in Example 3 and 0.1 part of platinum supported on alumina as catalyst was stirred and heated at 150–170° C. for 2 hours. After filtration to remove the catalyst the product was a viscous fluid of average composition

The structure was confirmed by measurement of the infra-red spectrum of the product.

This product was effective as a defoaming agent for a solution of a dimethylpolysiloxane in trichloroethylene.

EXAMPLE 9

37 parts of N-allylperfluoro-octanoamide, 27 parts of dimethylchlorosilane and 0.011 part of bis(diethylsulphide) platinous chloride complex were heated under reflux in 120 parts of toluene for 6 hours. The solvent was then removed by distillation and the product fractionally distilled to give 10 parts of 3-(perfluorooctanoylamino-)propyldimethylchlorosilane, B.P. 130°/0.03 mm. (found: Cl, 5.6%. $C_{13}F_{15}H_{13}NOSiCl$ requires Cl, 6.5%) and unreacted N-allylperfluoro-octanoamide (18 parts).

EXAMPLE 10

5 parts of 3-(perfluoro-octanoylamino-)propyldimethylchlorosilane in 50 parts of diethyl ether were washed with two portions (5 parts each) of saturated aqueous sodium chloride solution followed by two portions (5 parts each) of saturated aqueous sodium bicarbonate solution. The dried organic layer was devolatilised to give 4 parts of a clear viscous liquid $n^{22}=1.3710$. Found: N, 2.73%. The disiloxane $C_{14}F_{30}H_{26}N_2O_3Si$ requires N, 2.69%.

Infrared examination showed C=O (5.95μ), N—H str. (3.05μ), C—H str. (3.3–3.5μ), C—F str. (8–9μ), Si—O—Si (9.5μ) and (O—SiMe$_2$)—O (12.5μ) in addition to unassigned absorptions.

EXAMPLE 11

2 parts of water were mixed with 4.5 parts of 3-(perfluoro-octanoylamino-)dimethylchlorosilane and 4.25 parts of dimethyldichlorosilane in 20 parts of diethyl ether and the mixture then heated under reflux for 1½ hours. The mixture was treated with 10 parts of water, tained was heated at 100° C. for 5 hours, washed with 2 parts of water then with 2 parts of saturated aqueous sodium bicarbonate solution. The organic layer was dried, filtered through "Celite" and devolatilised. There were thus obtained 23 parts of a viscous clear pale yellow oil $n^{16}=1.3868$. Found: Si, 17.6%.

What we claim is:

1. Siloxanes which are the hydrolysis products of silanes of the general formula

wherein Y is selected from the group consisting of hydrogen, chlorine and fluorine, and is attached to the terminal carbon atom of the perfluoro-alkylene group $R_f$ of up to 18 carbon atoms, R is selected from the group consisting of hydrogen and lower alkyl groups, R' is a divalent hydrocarbyl group free from aliphatic unsaturation 2 to 11 carbon atoms, R'' is a hydrolyzable group selected from halogen, aryloxy and hydrocarbyloxy, R''' is hydrocarbyl groups selected from lower alkyl or aryl or hydrolyzable groups selected from halogen, aryloxy and hydrocarbyloxy and R'$^V$ is a hydrocarbyl group selected from lower alkyl and aryl, or the siloxanes which are the hydrolysis products of said silanes with one or more other hydrolyzable silanes.

2. Siloxanes according to claim 1 wherein the perfluoroalkylene group is selected from the group consisting of perfluoromethylene, perfluoropropylene, perfluorobutylene and perfluoro-octylene groups.

3. Siloxanes according to claim 1 wherein the group R is an alkyl group and has not more than 2 carbon atoms.

4. Siloxanes according to claim 1 wherein the group R' is an alkylene group which contains from 2 to 11 carbon atoms.

5. Siloxanes according to claim 4 wherein the group R' is selected from the group consisting of ethylene, propylene and butylene groups.

6. Siloxanes according to claim 1 wherein the groups R'' and R''' are selected from the group consisting of chlorine, methoxy, ethoxy, butoxy β-methoxyethoxy and β-ethoxy-ethoxy and acetoxy groups.

7. Siloxanes according to claim 1 wherein the group R'$^V$ is an alkyl group having not more than four carbon atoms.

8. Siloxanes according to claim 1 wherein the group R''' is an alkyl group having not more than four carbon atoms.

9. Siloxanes according to claim 1 wherein the groups R'$^V$ and R''' are selected from the group consisting of methyl, ethyl and phenyl groups.

10. Siloxanes according to claim 1 wherein the said silanes are selected from the group consisting of methyl-(perfluorooctano - amido)propyldichlorosilane, diethoxymethyl - γ - (perfluoro - octano - amido)propyl silano, methyl - γ - (perfluorobutyramido)propyl dichlorosilane, dimethyl - γ - (perfluorobutyramido)propylchlorosilane, and ethoxydimethyl - γ - (perfluoro-octano-amido)propylsilane.

11. Siloxanes containing units of the general formulae

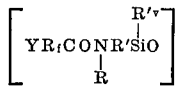

and

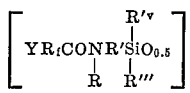

where Y is selected from the group consisting of hydrogen, chlorine and fluorine and is attached to the terminal carbon atom of the perfluoro-alkylene group $R_f$, R is selected from the groups consisting of hydrogen and alkyl groups, R' is a divalent hydrocarbyl group free from aliphatic unsaturation, R''' and R'$^V$ are hydrocarbyl groups with or without one or more other units of the general formulae

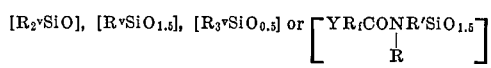

where R$^V$ is a hydrocarbyl group.

12. Siloxanes according to claim 11 wherein R'$^V$ is selected from the group consisting of methyl, ethyl, phenyl, vinyl and allyl groups.

13. A method of preparing a siloxane claimed in claim 1 wherein the said silanes are prepared by reacting a silane containing at least 1 silicon-bonded hydrogen atom with an N-alkylene amide of a perfluoroalkyl carboxylic acid.

14. A process for the production of a siloxane claimed in claim 1 comprising hydrolyzing the said silane alone or admixed with at least one other hydrolyzable silane selected from the group consisting of methylchlorosilanes, phenyl-chlorosilanes, methylphenylchlorosilanes and methylvinylethoxysilanes.

15. A process of producing siloxanes as claimed in claim 1 comprising reacting a lower alkyl ester or acid halide of a perfluoroalkyl carboxylic acid with an aminoalkyl-siloxane.

16. A process according to claim 15 wherein the aminoalkyl group is selected from the group consisting of 3-aminopropyl and 4-aminobutyl groups.

17. A process for preparing a siloxane as claimed in claim 1 wherein a siloxane containing at least one silicon-bonded hydrogen atom is reacted with an N-alkylene amide of a perfluoroalkyl carboxylic acid.

References Cited
UNITED STATES PATENTS

| | | | |
|---|---|---|---|
| 2,610,198 | 9/1952 | Sommer | 260—448.2 |
| 2,855,381 | 10/1958 | Sommer | 260—448.2X |
| 2,929,829 | 3/1960 | Morehouse | 260—448.2 |
| 2,973,383 | 2/1961 | Black | 260—448.2 |
| 3,179,622 | 4/1965 | Haluska | 260—448.2X |
| 3,288,754 | 11/1966 | Green | 260—448.2X |

TOBIAS E. LEVOW, Primary Examiner

P. F. SHAVER, Assistant Examiner

U.S. Cl. X.R.

260—46.5E, 46.5Y, 448.2N, 448.2E, 448.2B, 448.8R; 252—8.8, 357, 358